United States Patent [19]
Pearson

[11] Patent Number: 4,847,064
[45] Date of Patent: Jul. 11, 1989

[54] ECONOMICAL PROCESS FOR ALPHA ALUMINA PRODUCTION

[75] Inventor: Alan Pearson, Murrysville, Pa.

[73] Assignee: Aluminum Company of America, Pittsburgh, Pa.

[21] Appl. No.: 137,159

[22] Filed: Dec. 23, 1987

[51] Int. Cl.$^4$ ............................................. C01F 7/02
[52] U.S. Cl. ..................................... 423/625; 423/628; 423/135; 423/127; 501/153; 502/415
[58] Field of Search ............... 423/127, 135, 625, 628; 501/153; 502/415

[56] References Cited

U.S. PATENT DOCUMENTS

| | | | |
|---|---|---|---|
| 3,899,568 | 8/1975 | Frick et al. | 423/55 |
| 4,019,914 | 4/1977 | Esper et al. | 423/625 |
| 4,051,222 | 9/1977 | Gnyra | 423/121 |
| 4,175,118 | 11/1979 | Wassermann et al. | 423/628 |
| 4,568,527 | 2/1986 | Anjier et al. | 423/121 |
| 4,585,645 | 4/1986 | Sucech | 423/625 |
| 4,595,581 | 6/1986 | Misra et al. | 423/127 |
| 4,595,665 | 6/1986 | Takayama et al. | 501/128 |
| 4,657,754 | 4/1987 | Bauer et al. | 423/625 |
| 4,666,687 | 5/1987 | Chantriaux et al. | 423/121 |

FOREIGN PATENT DOCUMENTS 0168606  6/1984  European Pat. Off. ............. 423/625

OTHER PUBLICATIONS

Wefers et al, "Oxides and Hydroxides of Aluminum", Alcoa Technical Paper, No. 19, 1987, pp. 36–37.
Edwards, *The Aluminum Industry* vol. 1, 1st Ed., McGraw Hill, NY 1930, pp. 164–167.
Lussky, Edward N., "Experience with Operation of the Alcoa Fluid Flash Calciner", *Light Metals*, (1980), pp. 69–79.
Kumagai, Masato et al., "Controlled Transformation and Sintering of a Boehmite Sol—Gel by α—Alumina Seeding", *J. Am. Ceram. Soc.*, 68 [9], (1985), pp. 500–505.
Suwa; Yoshiko et al., "Lowering Crystallization Temperatures by Seeding in Structurally Diphasic Al$_2$O$_3$—MgO Xerogels", *J. Am. Ceram. Soc.*, 68 [9], (1985), pp. 238–240.
*Chemical Week*, Jun. 1, 1977, pp. 35–36.

Primary Examiner—Robert L. Stoll
Assistant Examiner—Paige C. Harvey
Attorney, Agent, or Firm—Glenn E. Klepac

[57] ABSTRACT

A process for making alpha alumina particles wherein a Bayer process caustic aluminate solution is treated with both alumina hydrate seed material and alpha alumina promoter particles to precipitate alumina hydrate particles. The precipitated particles are separated from the solution and then dried and calcined to produced alpha alumina particles. Addition of promoter particles in the precipitation step lowers the calcination temperature necessary to produce alpha alumina and results in smaller sized crystallites in the product.

19 Claims, 6 Drawing Sheets

ECONOMICAL PROCESS FOR ALPHA ALUMINA PRODUCTION

TECHNICAL FIELD

The present invention relates to processes for the production of alpha alumina. The product is useful as a ceramic or refractory material.

BACKGROUND OF THE INVENTION

Several different processes for making alpha alumina are described in the prior art. For example, one known process is described in an article by Edward N. Lussky entitled "Experience with Operation of the Alcoa Fluid Flash Calciner", *Light metals,* pages 59–79 (1980). The present invention represents an improvement upon the process described by Lussky in the aforesaid article.

In accordance with the present invention, alpha alumina production is promoted by addition of alpha alumina promoter particles along with alumina hydrate seed material in a Bayer process precipitation. The precipitated alumina hydrate particles are then dried and calcined. Addition of promoter particles during the precipitation step promotes alpha alumina formation in the calcination step. When the promoter particles are added. alpha alumina is formed at a lower temperature and in smaller particle size than when no promoter is utilized.

It is a principal objective of the present invention to provide an economical process for production of alpha alumina particles which substantially avoids any need for boehmite formation at an intermediate stage.

A related objective of the invention is to provide a process for making smaller particles of alpha alumina than in prior art processes based upon flash calcination of gibbsite particles.

Another related objective of the invention is to provide a process for production of alpha alumina particles wherein gibbsite particles are calcined at a lower temperature than in prior art processes.

Additional objectives and advantages of the present invention will become apparent to persons skilled in the art from the following specification and claims.

SUMMARY OF THE INVENTION

The principal starting material for the process of the present invention is an aqueous aluminate solution which is preferably obtained from the Bayer process. The aluminate solution contains about 50–400 g/l cuastic soda (expressed as $Na_2CO_3$) and about 0.50–0.80 grams $Al_2O_3$ per gram of caustic soda (expressed a $Na_2CO_3$). The term "caustic soda" as used herein refers to sodium hydroxide. The aluminate solution preferably has a caustic soda content of about 140–240 g/l (expressed as $Na_2CO_3$). The solution also preferably contains about 0.60–0.70 grams $Al_2O_3$ per gram of caustic soda (expressed as $Na_2CO_3$). Initial temperature of the solution is about 40°–100° C.

The aluminate solution is treated with alumina hydrate seed material and particles of an alpha alumina promoter, thereby to precipitate alumina hydrate particles containing the promoter. Preferably, the solution is also cooled as the seed material and promoter are added. The promoter preferably comprises about 0.01–10 wt% of the $Al_2O_3$ content in the precipitate, more preferably about 0.01–5 wt% and most preferably about 0.01–1 wt%. Average particle size of the promoter particles is generally less than about 1 micron.

The seed material preferably comprises particles of alumina trihydrate. The alumina trihydrate seed material may be gibbsite, bayersite, or mixtures thereof. More preferably, the seed material comprises predominantly gibbsite.

Precipitated alumina hydrate particles containing the promoter are separated from the aluminate solution, dried, and calcined at an elevated temperature to produce particles comprising predominantly alpha alumina. The alpha alumina particles produced preferably have an average crystallite size of less than about 1 micron. If the alpha alumina particles are agglomerated, they may be comminuted by grinding to an average particles size of less than about 1 micron.

As used herein, the term "alumina hydrate" refers to $Al_2O_3 \cdot xH_2O$, where x varies from 1 to 3; in other words, the water of hydration varies between 15 and 34.6% by weight of the alumina hydrate as determined by calcination. The expression "alumina trihydrate" refers to $Al_2O_3 \cdot 3H_2O$ or $Al(OH)_3$, also called "aluminum hydroxide". The terms "gibbsite" and "bayerite" refer to different crystalline forms of alumina trihydrate.

Alpha alumina particles produced by the claimed process are useful for making sintered ceramic shapes. The alpha alumina particles are pressed into a green shape and then the green shape is sintered at an elevated temperature. A sintering temperature of about 1400° C. is quite suitable. The sintered ceramic shapes are characterized by high bulk density and relatively small grain size.

DETAILED DESCRIPTION OF A PREFERRED EMBODIMENT

Figure 6:
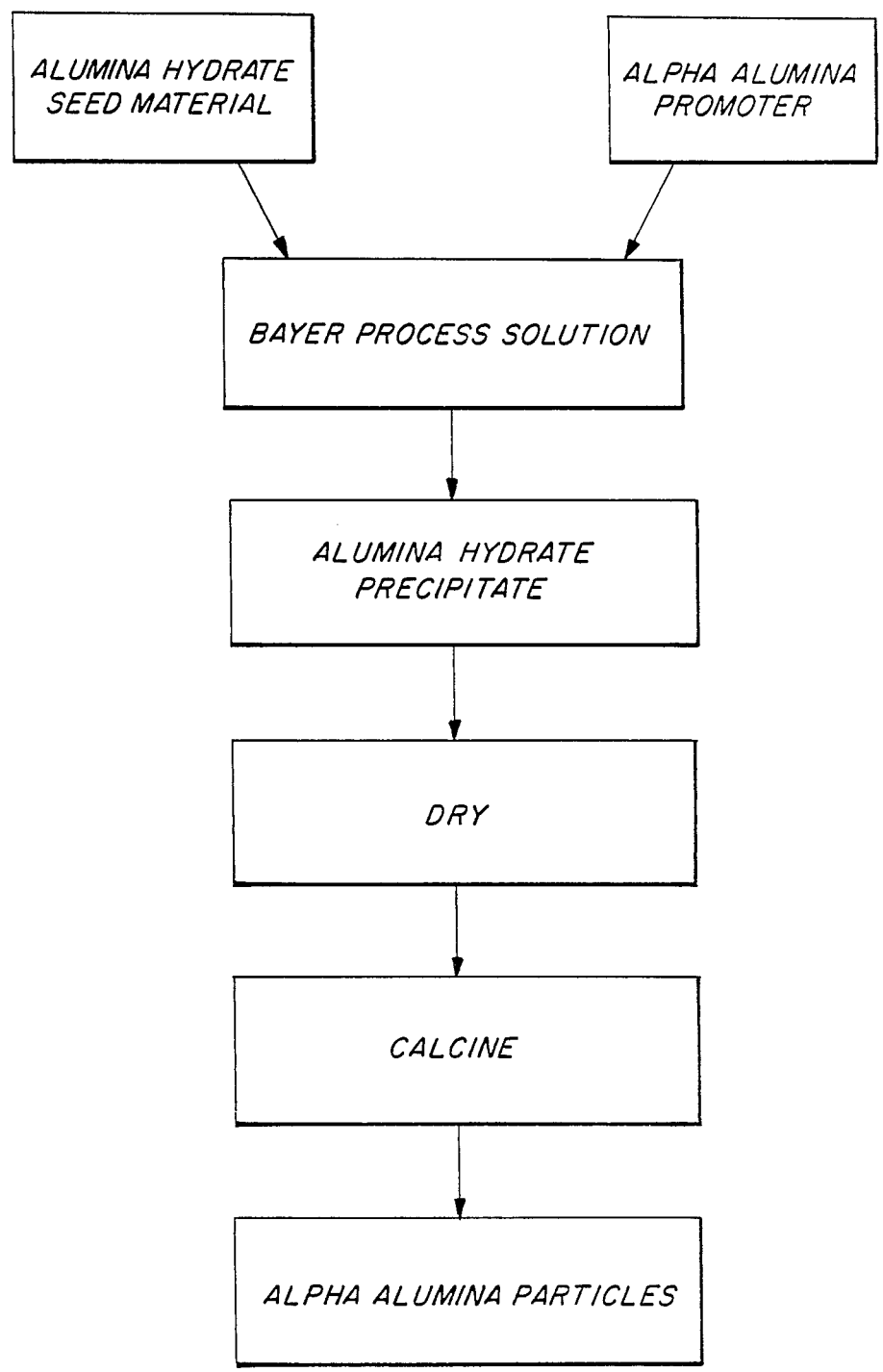
FIG. 6 is a flow sheet diagram of a particularly preferred process.

In accordance with the present invention, alpha alumina promoter particles are added to a Bayer process sodium aluminate solution along with alumina hydrate seed material, thereby to precipitate alumina hydrate particles containing the promoter. A flow sheet diagram of the entire claimed process is shown in FIG. 6. The following examples demonstrate some advantages of such promoter particle addition in the precipitation step.

EXAMPLE 1

(COMPARATIVE)

This example shows calcination and grinding behavior of an alumina hydrate sample precipitated without addition of alpha alumina promoter particles. The precipitation was conducted by adding 2 g/l of gibbsite seed material having about 1 micron average particle size to a sodium aluminate solution containing approximately 95 g/l $Al_2O_3$ and 150 g/l caustic soda (expressed as sodium carbonate equivalent). A preferred gibbsite seed material is sold by Aluminum Company of America under the trademark HYDRAL 710.

The suspension was agitated and held at 85° C. for 4 hours, then at 65° C. for 20 hours, and finally at 45° C. for 24 hours. These time/temperature conditions were chosen to simulate commercial product of chemical grade gibbsite having low sodium content. The precipitated particles were removed by filtration, then washed and dried. Approximately 100 g/l gibbsite was recovered. The product was composed of agglomerates (4 micron median diameter) of smaller (1-2 micron average diameter) gibbsite crystals with 0.04 wt% $Na_2O$ content.

Figure 1:
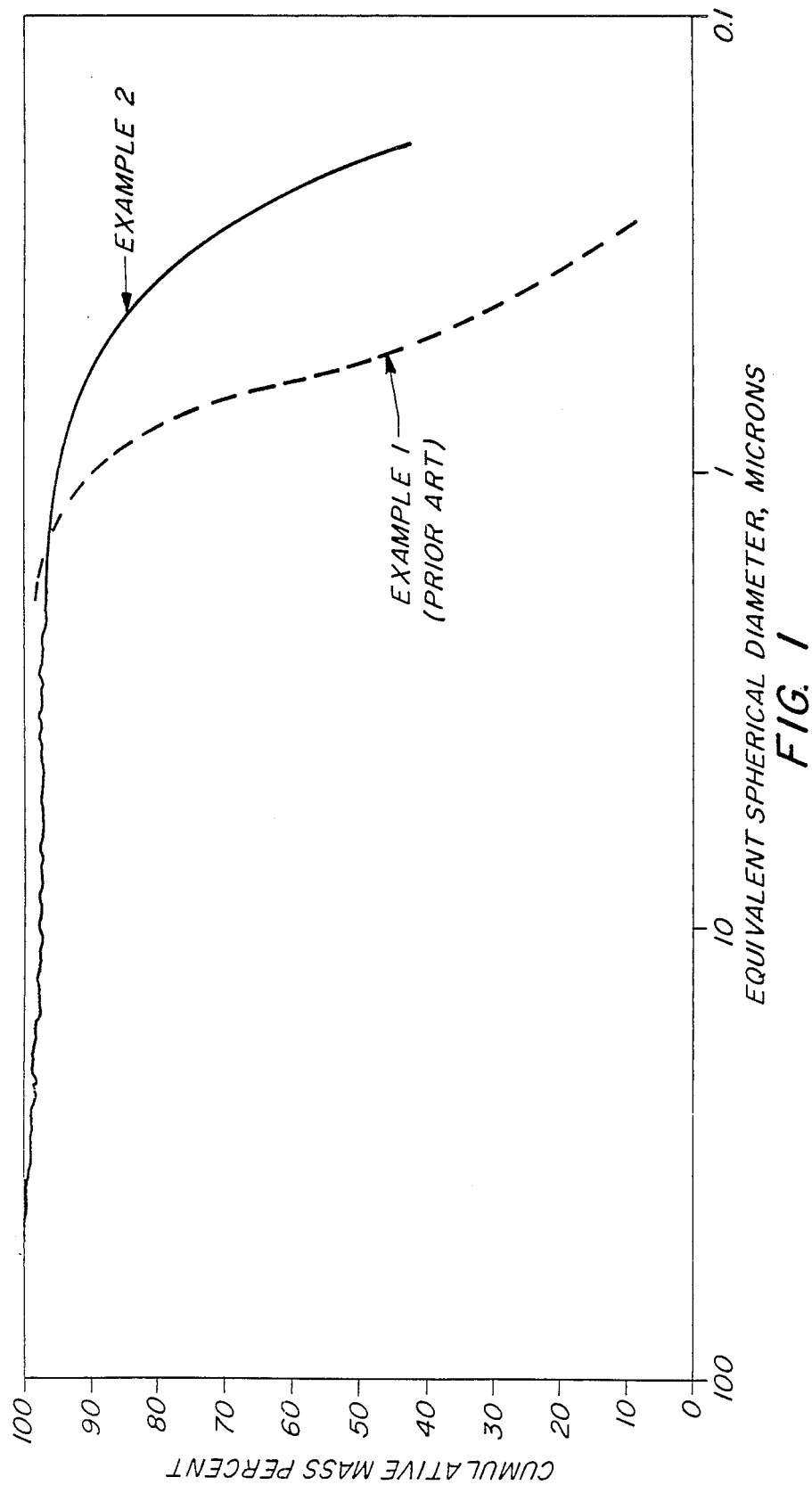
FIGS. 1 and 3–5 are graphs showing the size distribution of alpha alumina particles made in accordance with the prior art and in accordance with the present invention.

The gibbsite material was calcined by heating for 2 hours at 1200° C. and then ball milled for 16 hours. Particle size distribution of the ground product (measured by Micromeritics Sedigraph) is shown in FIG. 1. It can be seen that the median particle size is about 0.6 microns with about 90% of the particles below 1 micron.

EXAMPLE 2

This Example shows the effect of fine particle size alpha alumina promoter addition during precipitation of the gibbsite.

A batch of gibbsite particles was precipitated using 1 g/l of 0.25 micron average particle size gibbsite as precipitation seed material. Sodium aluminate liquor composition was essentially the same as in Example 1, but precipitation was begun at a temperature of 90° C. and the suspension was allowed to cool naturally. Time/temperature history of the precipitation step was as follows:

| Time After Seed Addition (Hours) | Temperature (°C.) |
| --- | --- |
| 0 | 90 |
| 4 | 85 |
| 45 | 60 |
| 125 | 48 |
| 144 | 41 |

Figure 2:
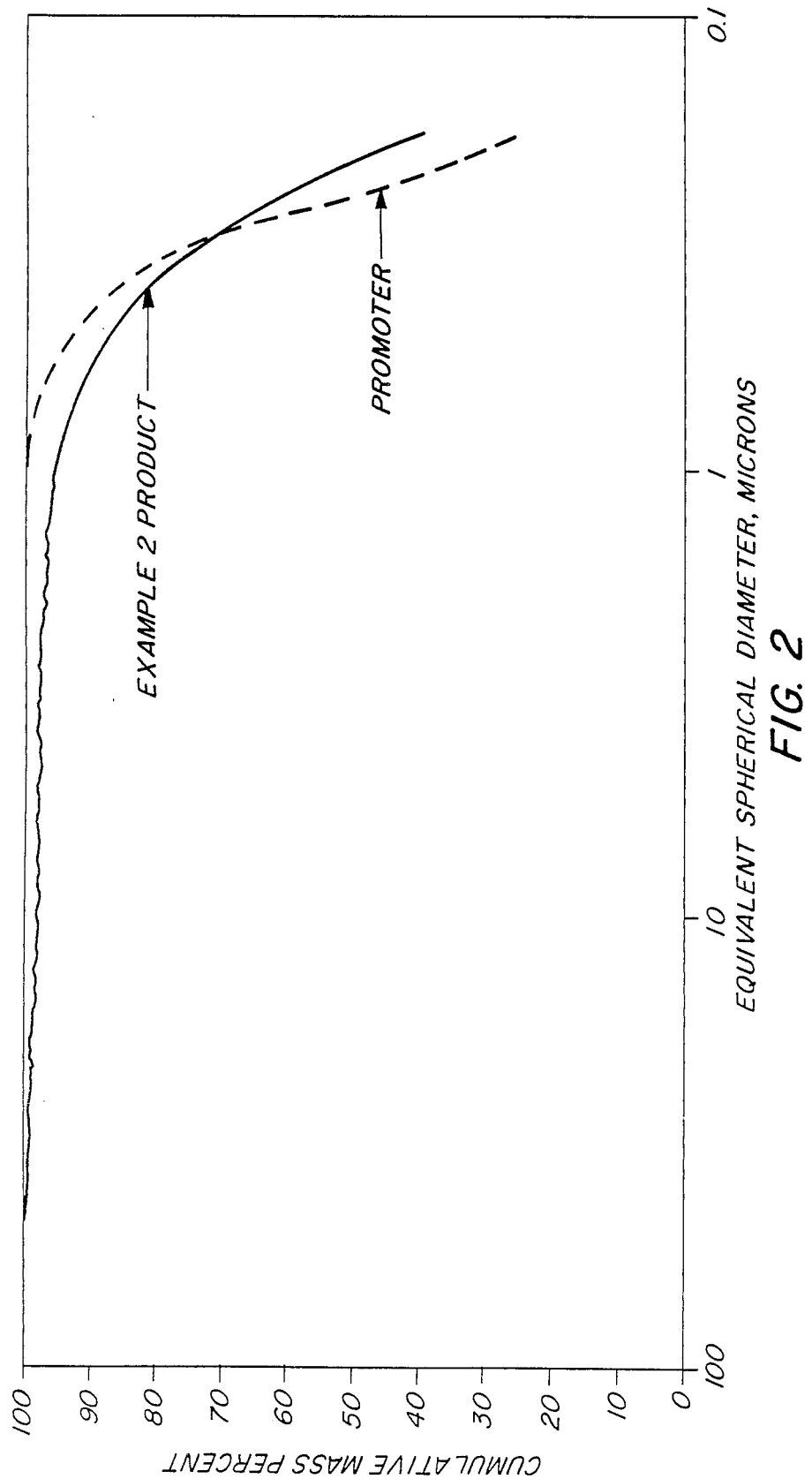
FIG. 2 is a graph showing the size distribution of alpha alumina promoter particles used in practicing the present invention.

During precipitation, 0.6 g/l of alpha alumina promoter particles having the size distribution shown in FIG. 2 were added stepwise to the slurry. The alpha alumina addition was 0.3 g/l at the beginning of precipitation, 0.15 g/l after 4 hours, and 0.15 g/l after 24 hours. This sequence was chosen in an attempt to distribute the promoter particles uniformly among the precipitating alumina particles. Gibbsite yield and $Na_2O$ content were similar to the product of Example 1. The gibbsite product was composed of 25 micron agglomerates with crystal sizes of about 2-5 microns.

This material was calcined for 2 hours at 1200° C., then ground by the procedure of Example 1 but for only 4 hours. Particle distribution of the ground product is shown in FIG. 1. It can be seen that the group product of Example 2 is much finer than that of Example 1 in spite of the fact it was ground for a shorter period of time. Approximately 95% of the Example 2 product is below 1 micron particle size.

FIG. 2 shows a comparison between particle size distribution of the promoter particles and particle size distribution of alpha alumina produced in Example 2. Surprisingly, the Example 2 product has a higher proportion of particles in the size range below about 0.25 microns than the promoter particles.

EXAMPLE 3

This example shows the effect of changing amounts of promoter particles on the gibbsite precipitation. In all of the tests in this Example, precipitations were made with sodium aluminate liquors having approximately the same composition and under the same time/temperature conditions as described in Example 1. The precipitation seed material was a mixture of gibbsite and bayerite particles having about 0.1 micron median particle size, and a seed charge of 1 g/l was used in each test. The amount of alpha alumina promoter used in these tests was varied in the range 0-5 wt% (based on $Al_2O_3$ content in the precipitated product). The alpha alumina promoter had the same particle size distribution as in Example 2, and it was charged incrementally, 40% at the beginning of precipitation, 40% after 4 hours, and 20% after 24 hours. After precipitation, the gibbsite particles were filtered, washed, and dried. In these tests, the washing was not as thorough as in Examples 1 and 2 and consequently, the residual $Na_2O$ content was somewhat higher than in those Examples. The precipitated products in Example 3 were agglomerates of 0.5-1.0 micron gibbsite crystals.

Each product was calcined for 2 hours at 1100°-1250° C. and surface are and alpha alumina content were determined for each calcination condition. These data are shown in Table I.

TABLE I

Calcined Properties of Gibbsite/Alpha Alumina Product

| Alpha Alumina Promoter Added (wt %)* | $Na_2O$ (wt %) | Surface Area ($m^2/g$) | | | | Alpha Alumina content (wt %) | | | |
| --- | --- | --- | --- | --- | --- | --- | --- | --- | --- |
| | | 1100° C. | 1150° C. | 1200° C. | 1250° C. | 1100° C. | 1150° C. | 1200° C. | 1250° C. |
| 0 | 0.14 | 22 | 20 | 12 | 7 | 5 | 36 | 64 | 91 |
| 0.01 | 0.13 | 14 | 10 | 8 | 7 | 70 | 90 | 94 | 96 |
| 0.05 | 0.10 | 12 | 10 | 9 | 7 | 90 | 93 | 94 | 95 |
| 0.20 | 0.21 | 12 | 11 | 10 | 8 | 88 | 91 | 91 | 94 |
| 1.00 | 0.21 | 11 | 11 | 6 | 7 | 94 | 95 | 97 | 96 |
| 5.00 | 0.34 | 14 | 13 | 10 | 7 | 83 | 83 | 88 | 83 |

*Based on $Al_2O_3$ content of the precipitate.

Because of the residual $Na_2O$ content in these samples, anything above 90 wt% alpha alumina is considered fully converted. It can be seen that without promoter addition, a calcination temperature of 1250° C. was required for full conversion to alpha alumina. This is a higher temperature than found necessary in the tests of Example 1, probably because of the higher content of $Na_2O$ which is known to retard transformation to alpha alumina.

Figure 3:
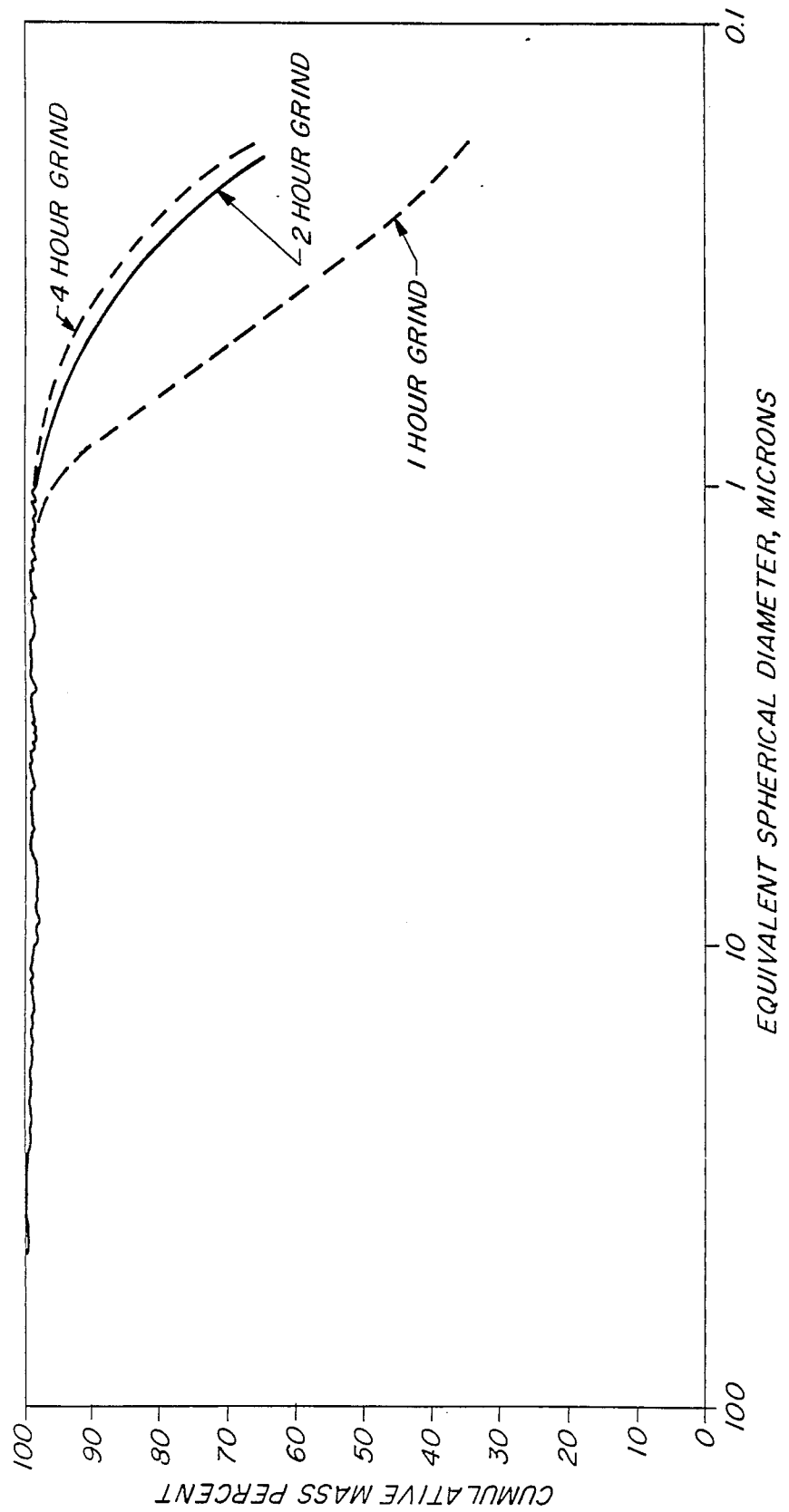
Figure 4:
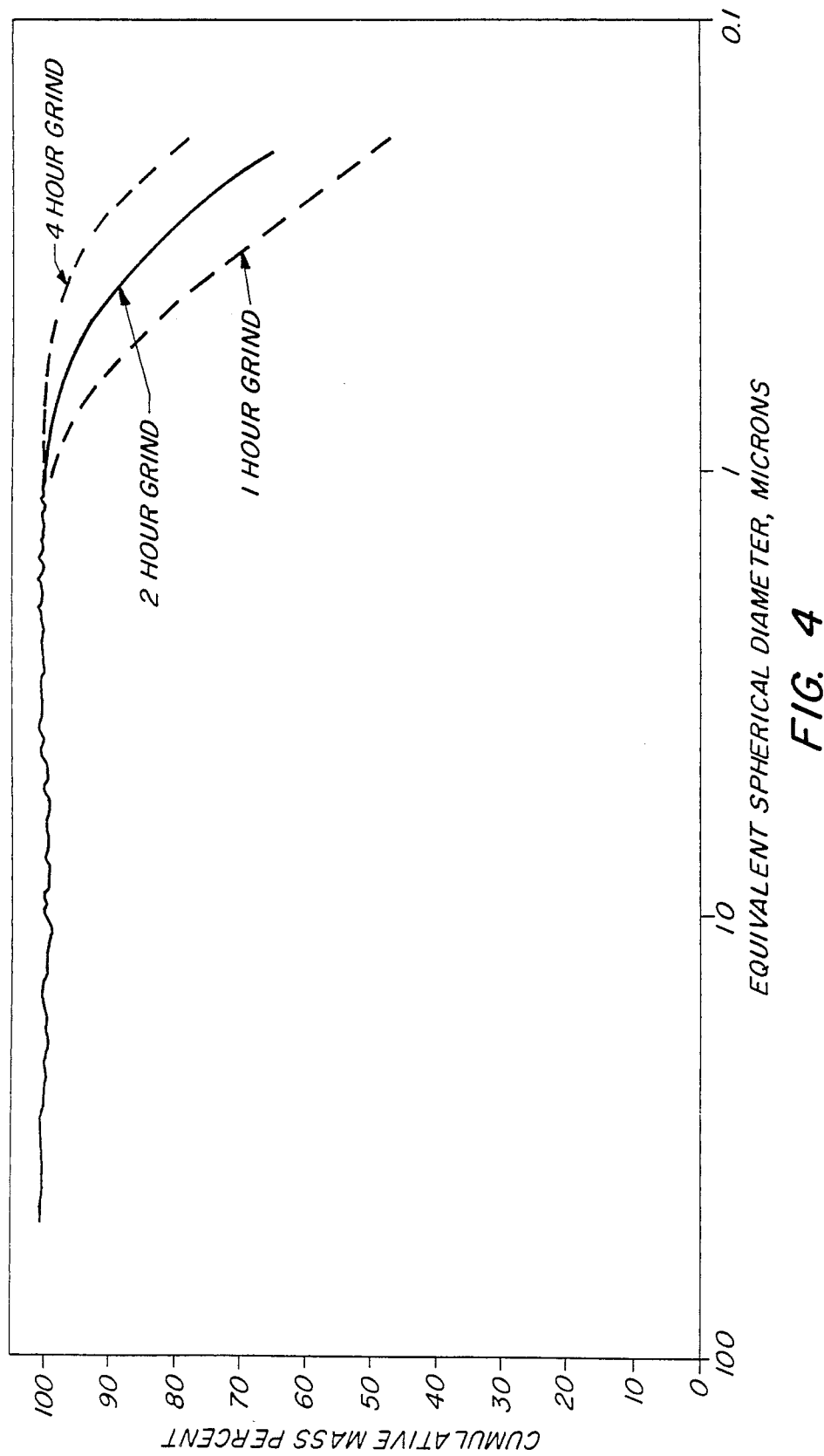

When as little as 0.01 wt% promoter was present, the alpha transformation temperature was reduced significantly. The data also show that by calcination at lower temperatures, higher surface area (finer crystal size) products are attained. FIGS. 3 and 4 show particle size data for some of these materials after dry grinding for 1-4 hours under the same conditions as in Example 1. The particle sizes shown in FIG. 3 were obtained from alumina precipitated by addition of 0.05 wt% alpha alumina promoter particles to the gibbsite seed material. The particle sizes in FIG. 4 were obtained on alumina precipitated by addition of 1.0 wt% alpha alumina promoter particles to the gibbsite seed material. In both cases, the precipitates were calcined at 1125° C.. The samples calcined after promoter addition are extremely easy to grind and median sizes below the range of Sedigraph detection (0.2 micron) were attained. Also, these samples contain little or no material above 1 micron average particle size.

Figure 5:
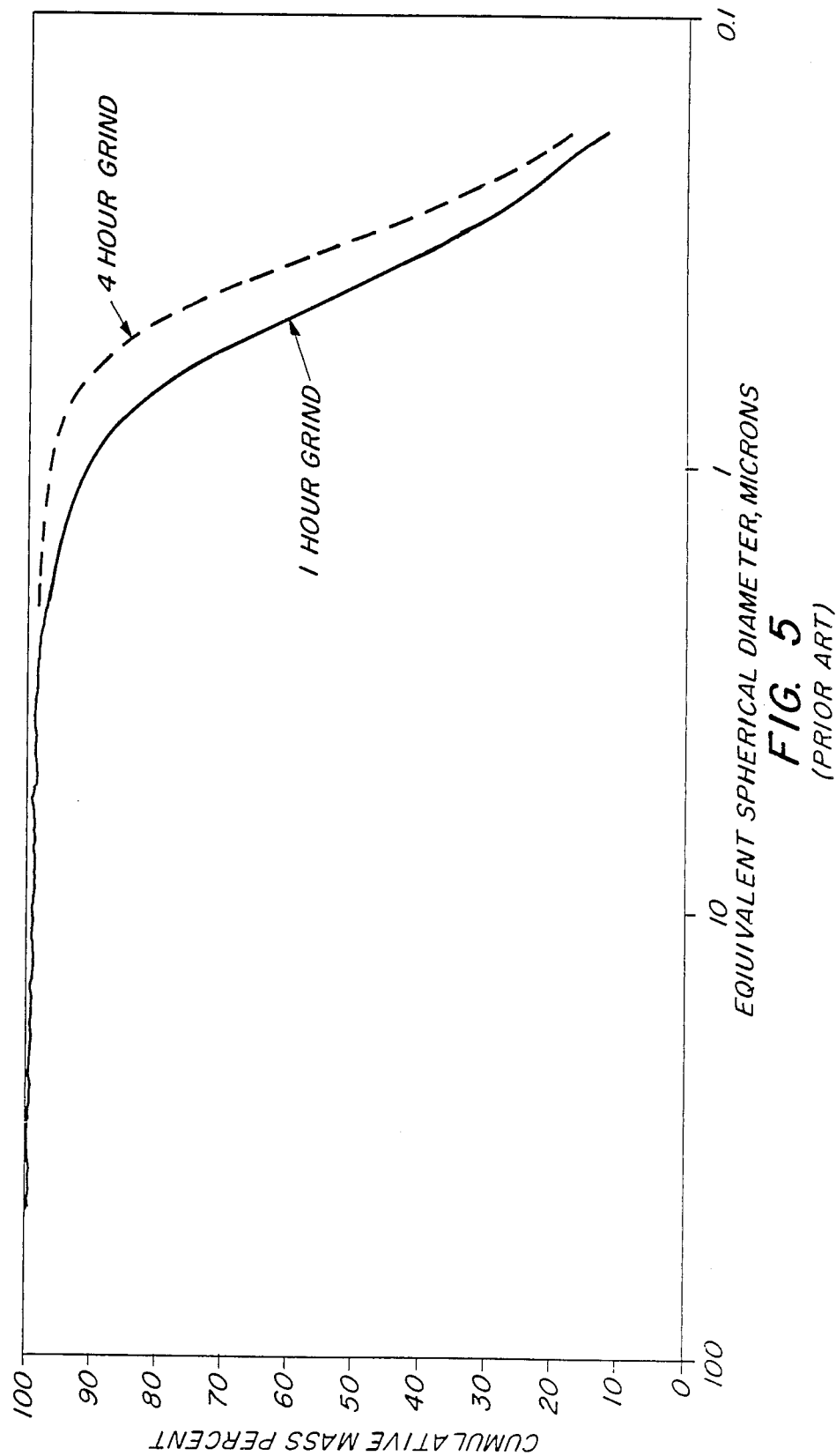

FIG. 5 shows similar data for the unpromoted sample calcined at 1250° C.. This material was very easy to grind compared with Example 1 but does not reach the fineness of the promoted samples.

EXAMPLE 4

This Example shows that powders prepared by calcination of gibbsite containing the promoter are excellent raw materials for high alumina ceramics. In order to reduce the effect of residual $Na_2O$, some of the gibbsite samples described in Example 3 were thermally decomposed by heating to 425° C., then leached with hot acetic acid at a pH of 5-6 thus lowering their $Na_2O$ content. These materials were calcined for 2 hours at 1125° C. and leached with water. After drying $Na_2O$ contents were found to be less than 0.01 wt% for all samples.

The samples were then ground for 4 hours, pressed into 1-inch diameter pellets having 0.25-inch thickness at a pressure of 5000 psi in a double piston mold and sintered for 1 hour at 1400° C.. After sintering, bulk densities of these samples were found to be 97.5, 96.5, and 95.2% of theoretical density (3.99 g/cc) for promoter levels of 5.0, 0.2, and 0.01 wt%, respectively. For unpromoted alumina, a sintering temperature more than 100° C. higher would be required to achieve comparable densities. One example of an unpromoted alpha alumina is available from Aluminum Company of America under the trademark A-16 SG. Because of the low sintering temperature, the median fired grain size of these samples was only about 1 micron. The combination of high density and small grain size in an alumina ceramic is very desirable for improved mechanical properties and surface finish.

While the invention has been described in terms of preferred embodiments, the claims appended hereto are intended to encompass all embodiments which fall within the spirit of the invention.

What is claimed is:

1. An economical process for producing particles of alpha alumina, comprising the steps of:
   (a) providing an aqueous aluminate solution containing about 50-400 g/l caustic soda and about 0.50-0.80 grams $Al_2O_3$ per gram of caustic soda;
   (b) treating the aqueous aluminate solution with alumina hydrate seed material and particles of an alpha alumina promoter, thereby to precipitate from the aqueous aluminate solution alumina hydrate particles containing the alpha alumina promoter;
   (c) separating the precipitated alumina hydrate particles from the aqueous aluminate solution;
   (d) drying said alumina hydrate particles; and
   (e) calcining said alumina hydrate particles to produce particles comprising predominantly alpha alumina.

2. The process according to claim 1 further comprising:
   (f) comminuting said alpha alumina particles to an average particle size of less than about 1 micron.

3. The process according to claim 1 wherein said alpha alumina promoter comprises about 0.01-10 wt% of the $Al_2O_3$ content of the precipitated alumina hydrate particles.

4. The process according to claim 1 wherein said alpha alumina promoter comprises about 0.01-5 wt% of the $Al_2O_3$ content of the precipitated alumina hydrate particles.

5. The process according to claim 1 wherein said alpha alumina promoter comprises about 0.01-1 wt% of the $Al_2O_3$ content of the precipitated alumina hydrate particles.

6. The process according to claim 1 wherein said alumina hydrate seed material comprises alumina trihydrate particles.

7. The process according to claim 1 wherein asid alumina hydrate seed material comprises predominantly gibbsite.

8. The process according to claim 1 wherein the aqueous aluminate solution in step (a) has a temperature of about 40°-100° C. and the alumina hydrate particles precipitated in step (b) comprise alumina trihydrate.

9. The process according to claim 8 wherein step (b) further comprises cooling said aqueous aluminate solution.

10. The process according to claim 1 wherein said aluminate solution is a Bayer process product.

11. The process according to claim 1 wherein the alpha alumina particles have an average crystallite size of less than about 1 micron.

12. In a process for producing particles of alpha alumina comprising the steps of:
   (a) obtaining a Bayer process solution containing dissolved caustic soda and $Al_2O_3$;
   (b) treating the Bayer process solution with alumina hydrate seed material to precipitate alumina hydrate particles;
   (c) separating the precipitated alumina hydrate particles from said Bayer process solution;
   (d) drying said alumina hydrate particles; and
   (e) calcining said alumina hydrate particles to produce particles comprising predominantly alpha alumina; the improvement wherein, for the purpose of promoting conversion of alumina hydrate to alpha alumina in step (e) and reducing average crystallite size of the particles predominantly alpha alumina, step (b) further comprises treating said Bayer process solution with about 0.01-10 wt% alpha alumina promoter particles, based upon the $Al_2O_3$ content of the precipitated alumina hydrate particles, said alpha alumina promoter particles having an average particle size of less than about 1 micron.

13. The process according to claim 12 wherein the alumina hydrate particles precipitated in step (b) comprise alumina trihydrate.

14. The process according to claim 12 wherein the Bayer process solution has a temperature of about 40°-100° C. in step (b) and the precipitated alumina hydrate particles comprise alumina trihydrate.

15. The process according to claim 14 wherein the Bayer process solution has a temperature of about 41°-90° C. in step (b).

16. The process according to claim 12 wherein said alpha alumina promoter comprises about 0.01-1 wt% of the $Al_2O_3$ content of the precipitated alumina hydrate particles.

17. The process according to claim 1 wherein the aluminate solution has a temperature of about 41°-90° C. in step (b).

18. The process according to claim 17 wherein the precipitated alumina hydrate particles comprise alumina trihydrate.

19. An economical process for producing particles comprising predominantly alpha alumina, said process comprising the steps of:

(a) providing an aqueous sodium aluminate solution containing about 140-240 g/l caustic soda and about 0.50-0.80 grams $Al_2O_3$ per gram of caustic soda, said sodium aluminate solution having a temperature of about 40°-100° C.;

(b) treating said sodium aluminate solution with:
  (1) alumina trihydrate seed material, and
  (2) particles of an alpha alumina promoter having less than about 1 micron average particle size, thereby to precipitate from said sodium aluminate solution alumina trihydrate particles containing the alpha alumina promoter;

(c) separating said alumina trihydrate particles from said sodium aluminate solution, and (d) drying and calcining said alumina trihydrate particles, thereby producing particles comprising predominantly alpha alumina.

* * * * *